United States Patent
Wollner et al.

(10) Patent No.: US 9,869,351 B2
(45) Date of Patent: Jan. 16, 2018

(54) SPRING STRUT BEARING

(71) Applicant: Schaeffler Technologies AG & Co. KG, Herzogenaurach (DE)

(72) Inventors: Andreas Wollner, Nuremberg (DE); Alexander Zernickel, Herzogenaurach (DE); Rainer Lutz, Markt Erlbach (DE); Ralf Stautner, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/034,594

(22) PCT Filed: Sep. 2, 2014

(86) PCT No.: PCT/DE2014/200437
§ 371 (c)(1),
(2) Date: May 5, 2016

(87) PCT Pub. No.: WO2015/067251
PCT Pub. Date: May 14, 2015

(65) Prior Publication Data
US 2016/0281784 A1    Sep. 29, 2016

(30) Foreign Application Priority Data
Nov. 8, 2013  (DE) .................. 10 2013 222 727

(51) Int. Cl.
*B60G 15/06* (2006.01)
*F16C 33/74* (2006.01)
(Continued)

(52) U.S. Cl.
CPC ............ *F16C 35/06* (2013.01); *B60G 15/068* (2013.01); *F16C 33/74* (2013.01); *F16C 33/78* (2013.01);
(Continued)

(58) Field of Classification Search
CPC ...... F16C 2326/05; F16C 35/02; F16C 35/06; F16C 33/74; F16C 33/78; B60G 15/068; B60G 2204/128; B60G 2204/418
See application file for complete search history.

(56) References Cited

U.S. PATENT DOCUMENTS 4,948,272 A * 8/1990 Stowe .................. B60G 15/068
                                                 384/607
5,439,298 A * 8/1995 Zernickel ............. B60G 15/068
                                                 384/499
(Continued)

FOREIGN PATENT DOCUMENTS

DE         10047773       4/2002
DE       102006057559     6/2008
(Continued)

*Primary Examiner* — Alan B Waits
(74) *Attorney, Agent, or Firm* — Volpe and Koenig, P.C.

(57) ABSTRACT

A spring strut bearing with a cap and with a guide ring which is mounted in a rotatable manner relative to the cap about a rotational axis (D), an axial bearing being arranged between the cap and the guide ring. The cap has a seal, and the cap is connected to the guide ring at an inner diameter of the cap by a snap-in connection. The cap has a first element of the snap-in connection, and the guide ring has a second element of the snap-in connection, said elements engaging into each other in a formfitting manner. The first element is designed as a two-component part, the soft component of which engages into the second element in a formfitting manner and the hard component of which forms a reinforcement of the soft component.

8 Claims, 1 Drawing Sheet

(51) Int. Cl.
  *F16C 35/06* (2006.01)
  *F16C 33/78* (2006.01)
  *F16C 35/02* (2006.01)

(52) U.S. Cl.
  CPC ........ *F16C 35/02* (2013.01); *B60G 2204/128* (2013.01); *B60G 2204/418* (2013.01); *F16C 2326/05* (2013.01)

(56) References Cited

U.S. PATENT DOCUMENTS

| | | | | |
|---|---|---|---|---|
| 6,267,512 B1 * | 7/2001 | Beghini | ............... | B60G 15/068 384/607 |
| 7,922,397 B2 * | 4/2011 | Beauprez | ............ | B60G 15/068 384/606 |
| 8,308,176 B2 * | 11/2012 | Lenon | .................. | B60G 15/068 267/220 |
| 8,474,846 B2 * | 7/2013 | Dubus | ................. | B60G 15/068 188/321.11 |
| 8,740,472 B2 * | 6/2014 | Corbett | ............... | B60G 15/067 384/609 |
| 8,840,316 B2 * | 9/2014 | Montboeuf | ......... | B60G 15/068 384/607 |
| 8,851,762 B2 * | 10/2014 | Corbett | ............... | B60G 15/068 384/609 |
| 8,876,398 B2 * | 11/2014 | Corbett | ................ | B60G 15/068 277/581 |
| 8,876,399 B2 * | 11/2014 | Lutz | ........................ | F16C 19/10 384/607 |
| 9,234,541 B2 * | 1/2016 | Stautner | ............... | B60G 15/068 |
| 9,581,213 B2 * | 2/2017 | Lee | ......................... | F16F 1/127 |
| 2007/0255467 A1 * | 11/2007 | Blanchin | .............. | B60C 23/061 701/38 |
| 2012/0213464 A1 * | 8/2012 | Stautner | ............... | B60G 15/067 384/607 |
| 2012/0321238 A1 * | 12/2012 | Corbett | ................ | B60G 15/068 384/590 |
| 2013/0195393 A1 | 8/2013 | Corbett et al. | | |
| 2013/0313766 A1 * | 11/2013 | Bussit | .................. | B60G 15/068 267/195 |
| 2014/0010491 A1 | 1/2014 | Lutz et al. | | |

FOREIGN PATENT DOCUMENTS

| | | | |
|---|---|---|---|
| DE | 102011085557 | 5/2013 | |
| DE | 102011087167 | 5/2013 | |
| DE | 102011087167 A1 * | 5/2013 | .......... B60G 15/068 |
| DE | 102012202157 | 8/2013 | |
| DE | 102012211457 | 1/2014 | |
| FR | 2839471 | 11/2003 | |
| FR | 2954433 | 6/2011 | |
| JP | 2013234755 A * | 11/2013 | .......... B60G 15/068 |

* cited by examiner

SPRING STRUT BEARING

FIELD OF THE INVENTION

The invention relates to a spring strut bearing that is provided for use in spring struts.

BACKGROUND

Spring strut bearings are part of the wheel suspension in independent wheel suspension systems. The wheel suspension system supports the goals of driving safety and driving comfort, as well as easy and precise steering of the wheels. The wheel suspension should keep road surface noises away from the body and be as lightweight as possible. Depending on the design, the spring strut bearing guides the shock absorber spring and forms a support surface for the shock absorber end stop. The spring strut bearing absorbs the radial and axial forces transmitted via the shock absorber spring or the shock absorber and ensures that the shock absorber spring turns with low friction and without twisting for the steering and spring deflection and thus operates without a restoring moment.

Spring strut bearings are often part of so-called MacPherson struts. The spring strut is formed essentially of a spring, shock absorber, and stub axle. The spring strut bearing is provided with a cap that is mounted on the chassis-side spring strut brace, and also with a guide ring on which the shock absorber spring is supported and guided by this guide ring. The guide ring is supported so that it can rotate relative to the cap. The bearing enables a rotation of the spring relative to the body during steering, because the entire spring strut turns during steering movements.

From DE 10 2006 057 559 A1, a spring strut bearing is known that has a cap and a guide ring that can rotate relative to the cap. Between the cap and guide ring there is an axial bearing. The cap and guide ring are joined together captively as one unit with a positive-fit connection by a snap-on connection. A sealing element that extends on the inner and outer periphery of the cap is formed integrally with the cap.

SUMMARY

The object of the present invention is to provide a spring strut bearing that has a simple construction and can be produced economically.

According to the invention, this object is achieved by a spring strut bearing with a cap and with a guide ring that is supported so that it can rotate relative to the cap about a rotational axis, wherein an axial bearing is arranged between the cap and the guide ring, wherein the cap has a seal and wherein the cap is connected to the guide ring on an inner diameter of the cap by a snap-on connection and wherein the cap has a first element of the snap-on connection and the guide ring has a second element of the snap-on connection that engage in each other with a positive fit, wherein the first element is constructed as a two-component part whose soft component engages with a positive fit in the second element and whose hard component forms a reinforcement of the soft component.

Spring strut bearings have a cap and a guide ring connected captively to the cap by a snap-on connection. Between the cap and the guide ring, a bearing is provided. This bearing can be formed as an axial bearing or radial bearing, as well as a sliding bearing or also as a rolling bearing.

By use of the cap, the spring strut bearing is mounted on the chassis-side spring strut brace or the top mount.

The spring strut bearing according to the invention has a cap that has a first element of the snap-on connection. The snap-on connection is provided on the inner diameter of the cap, wherein the cap has a first element of the snap-on connection. The first element is constructed as a two-component part that has a soft component and a hard component. The soft component engages in the second element of the guide ring with a positive fit. The hard component is used for reinforcing the soft component. The reinforcement of the soft component by the hard component has the advantage that disassembly forces of the bearing housing can be increased. This means that disassembly forces greater than 100 N can be realized. In addition, an improved sealing effect of the snap-on connection is achieved by the soft component.

Advantageously, the entire cap is formed from a two-component part. The two-component part is produced, for example, by a two-component injection molding process in which the two components are connected to each other with a substance bonding fit.

In one preferred construction of the invention, the hard component is provided on the inner diameter of the soft component in order to achieve optimum reinforcement. In addition, the hard component forms a protection of the soft component, whereby this component can be protected from effects of large forces. Such protection leads to an increase in the service life of the spring strut bearing.

Advantageously, the hard component has a segmented design. The hard component is uniformly distributed on the inner diameter of the soft component, provided as individual segments. This construction has the advantage that, at locations where no hard component is provided, the snap-on connection also has an elastic construction. Another advantage is provided in that, because the snap-on connection is constructed by the soft component, less noise is generated when the cap and the guide ring rub against each other.

In another construction of the invention, the hard component extends over the entire inner diameter of the soft component. Through the surrounding hard component, it is possible to achieve sufficient stiffening of the soft component. Consequently, wear in the event of large disassembly forces can be reduced and the service life can be increased.

Advantageously, the hard component is a polyamide. The use of other plastics or metallic materials is also conceivable.

Advantageously, the first element is constructed as a snap-on rim. The snap-on rim can have a surrounding construction, but alternatively can also be constructed by multiple snap-on tabs. The snap-on rim is constructed as a part of the cap that projects in the axial direction of the rotational axis and engages in the second element of the guide ring.

In one construction of the invention, the seal has a sealing element that forms a rubbing contact on the guide ring. The seal can have a sleeve-shaped construction with end-side sealing lips. Advantageously, the seal could also have two sealing lips. The sealing lips or sealing lip could border a ring-shaped hollow space that can be filled, for example, with grease for improving the sealing effect. Any other form of seal and other arrangement are also possible.

The material of the seal can be an elastomer or another plastic that has rubber-like properties. The seal enables, independent of the positioning and centering of the spring strut bearing relative to the assemblies of the spring strut, a sealing relative to a counter sealing surface.

BRIEF DESCRIPTION OF THE DRAWINGS

Three embodiments of the invention are shown below with reference to three figures. Shown are.

DETAILED DESCRIPTION OF THE PREFERRED EMBODIMENTS

Figure 1:
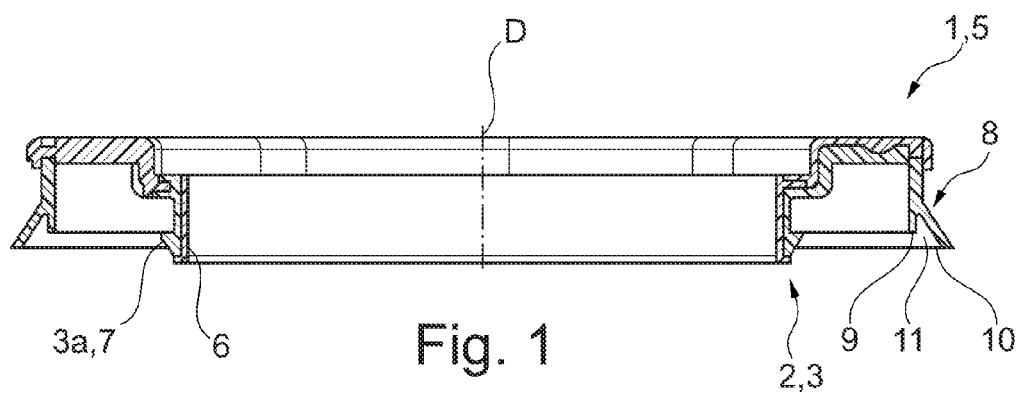
FIG. 1 a longitudinal section through a cap of the spring strut bearing according to the invention according to a first embodiment, FIG. 2 a longitudinal section through a cap of the spring strut bearing according to the invention according to a second embodiment, and FIG. 3 a longitudinal section through a cap of the spring strut bearing according to the invention according to a third embodiment.

FIG. 1 shows a longitudinal section through a cap 1 of the spring strut bearing according to the invention according to a first embodiment. The spring strut bearing has a cap 1 and a not-shown guide ring that is supported so that it can rotate about a rotational axis D relative to the cap 1. The cap 2 is connected to the guide ring by a snap-on connection 2. The cap 1 is mounted on a not-shown brace of a chassis of a motor vehicle. The guide ring receives an axial end of a not-shown shock absorber spring. Spring forces of the shock absorber spring are guided via the guide ring into the cap 1 and from there into the brace.

The cap 1 is constructed as a ring-shaped two-component part. The cap 1 has a first element 3 of the snap-on connection 2 forming an axially extending sleeve that is provided on the inner diameter of the cap. This element 3 projects on a thin-wall section and is constructed as a radially extending portion forming a snap-on rim 3a or multiple snap-on tabs. The first element 3 is constructed as a two-component part 5 and has a hard component 6 and a soft component 7. The two-component part 5 is preferably produced in a two-component injection molding process. As the hard component 6, e.g., a polyamide can be used.

The soft component 7 is used for the positive-fit connection to the guide ring, wherein the soft component 7 forms the part of the snap-on rim 3a. Furthermore, the soft component 7 seals the spring strut bearing on the inner diameter. The hard component 6 includes an axially extending reinforcement that is used for stiffening the soft component 7. From Figure lit can be seen that the hard component 6 extends over the entire inner diameter of the soft component 7.

On the outer periphery of the cap 1, a seal 8 is formed as a sleeve-shaped projection with sealing lips 9, 10 provided on the end. The sealing lips 9, 10 project axially from the spring strut bearing. A ring-shaped hollow space 11 is formed between the sealing lips 9, 10.

Figure 2:
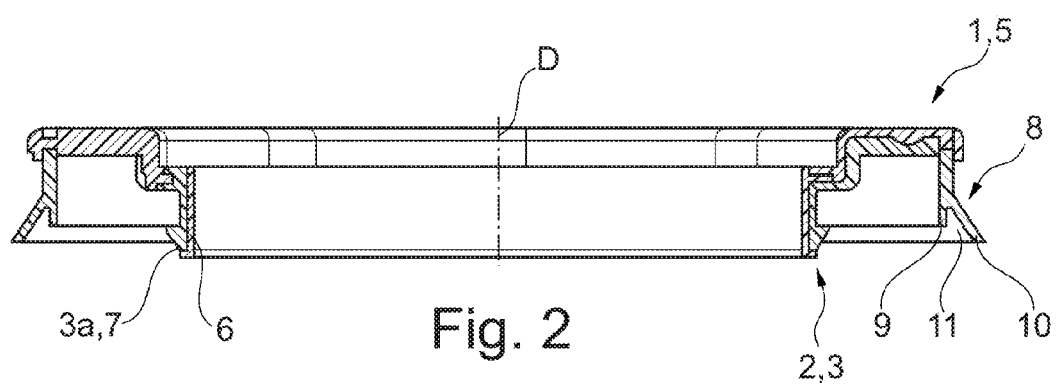
Figure 3:
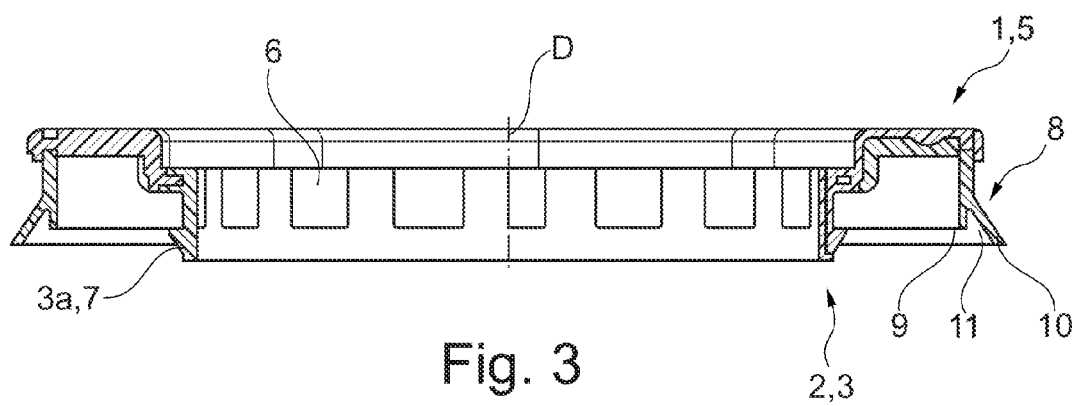

FIG. 2 and FIG. 3 show a longitudinal section through a cap of the spring strut bearing according to the invention according to a second and third embodiment. Matching components are provided with the same reference symbols as in the preceding FIG. 1. The following description is therefore largely limited to the differentiating features.

As can be seen from FIG. 2, in this embodiment the hard component 6 is provided on the entire inner diameter. In contrast to FIG. 1, the hard component 6 is injected below the area of the snap-on rim 3a.

From FIG. 3 it can be seen that the hard component 6 has a segmented construction and is provided on the inner diameter of the soft component 7. This has the result that the snap-on connection 2 has an elastic construction.

LIST OF REFERENCE NUMBERS

D Rotational axis
1 Cap
2 Snap-in connection
3 First element
3a Snap-in rim
5 Two-component part
6 Hard component
7 Soft component
8 Seal
9 Sealing lip
10 Sealing lip
11 Hollow space

The invention claimed is:

1. A spring strut bearing comprising: a cap, a guide ring supported for rotation about a rotational axis (D) relative to the cap, an axial bearing between the cap and the guide ring, a seal on the cap and the cap is connected to the guide ring on an inner diameter of the cap by a snap-in connection, the cap including a first element of the snap-in connection and the guide ring including a second element of the snap-in connection, which engage in each other with a positive-fit connection, the first element is a two-component part including an axially extending sleeve having a soft component that engages with a positive-fit connection in the second element and a hard component that forms a reinforcement of the soft component, the soft component is relatively softer than the hard component, the soft component and the hard component forming the snap-in connection, the soft component including a radially extending projection, the hard component including an axially extending reinforcement and defining a radially innermost surface of the snap-in connection, and the radially extending projection being reinforced by the axially extending reinforcement.

2. The spring strut bearing according to claim 1, wherein the hard component is provided on an inner diameter of the soft component.

3. The spring strut bearing according to claim 1, wherein the hard component has a segmented design.

4. The spring strut bearing according to claim 1, wherein the hard component extends over an entire inner diameter of the soft component.

5. The spring strut bearing according to claim 1, wherein the hard component is a polyamide.

6. The spring strut bearing according to claim 1, wherein the first element is constructed as a snap-on rim.

7. The spring strut bearing according to claim 1, wherein the seal has a sealing element that forms a rubbing contact on the guide ring.

8. The spring strut bearing according to claim 1, wherein the hard component extends along an entire radial inner surface of the soft component at the snap-in connection.

* * * * *